(12) United States Patent
Houssat et al.

(10) Patent No.: US 11,396,275 B2
(45) Date of Patent: Jul. 26, 2022

(54) DEVICE FOR CONTROLLING AND REGULATING A WINDSCREEN WIPER BLADE HEATING CIRCUIT

(71) Applicant: Valeo Systemes D'Essuyage, La Verriere (FR)

(72) Inventors: Stephane Houssat, Issoire (FR); Vincent Gaucher, Issoire (FR); Guillaume Mouleyre, Issoire (FR); William Terrasse, Issoire (FR)

(73) Assignee: Valeo Systemes d'Essuyage, La Verriere (FR)

( * ) Notice: Subject to any disclaimer, the term of this patent is extended or adjusted under 35 U.S.C. 154(b) by 133 days.

(21) Appl. No.: 16/613,129

(22) PCT Filed: May 24, 2018

(86) PCT No.: PCT/EP2018/063738
§ 371 (c)(1),
(2) Date: Nov. 13, 2019

(87) PCT Pub. No.: WO2018/215631
PCT Pub. Date: Nov. 29, 2018

(65) Prior Publication Data
US 2020/0339072 A1    Oct. 29, 2020

(30) Foreign Application Priority Data

May 24, 2017  (FR) ...................................... 1754646

(51) Int. Cl.
*B60S 1/38*  (2006.01)
*B60S 1/08*  (2006.01)

(52) U.S. Cl.
CPC ........... *B60S 1/3805* (2013.01); *B60S 1/0896* (2013.01); *B60S 1/0866* (2013.01)

(58) Field of Classification Search
CPC ........ B60S 1/0896; B60S 1/3805; B60S 1/38; B60S 1/40; B60S 1/3803; H05B 3/14;
(Continued)

(56) References Cited

U.S. PATENT DOCUMENTS 5,796,613 A * 8/1998 Kato ...................... G01C 21/28
342/457
2008/0256738 A1* 10/2008 Malone ................. B60S 1/3805
15/250.06

FOREIGN PATENT DOCUMENTS

CA       2740384 A1     4/2010
DE  102008039690 A1    3/2010
(Continued)

OTHER PUBLICATIONS

Int'l Search Report for PCT/EP2018/063738, dated Jul. 23, 2018.
(Continued)

*Primary Examiner* — Katina N. Henson
(74) *Attorney, Agent, or Firm* — Valeo Systemes d'Essuyage

(57) ABSTRACT

The invention proposes an autonomous device for controlling a heating circuit of an automotive vehicle windscreen wiper blade, comprising a module for regulating the electrical power supply of the heating circuit, furnished with an input for connecting to an electrical energy generator and with an output for connecting to a said windscreen wiper blade heating circuit. This device comprises means for acquiring, at an instant t, a datum representative of a temperature outside the vehicle on the one hand and of a datum representative of the instantaneous speed of the vehicle on the other hand, the said acquiring means being configured to transmit these data to the regulating module.

11 Claims, 2 Drawing Sheets

(58) Field of Classification Search
CPC . H05B 3/146; H05B 2203/02; H05B 2214/02
USPC ............. 15/250.05, 250.07, 250.31; 219/202
See application file for complete search history.

(56) References Cited

FOREIGN PATENT DOCUMENTS

| | | |
|---|---|---|
| DE | 102008049270 A1 | 4/2010 |
| JP | 2001183148 A | 7/2001 |
| JP | 2007269247 A | 10/2007 |
| JP | 2012505111 A | 3/2012 |
| WO | 2011/079990 A1 | 7/2011 |
| WO | 2014/121061 A1 | 8/2014 |

OTHER PUBLICATIONS

Patent Office of Japan, First Office Action (with English translation) of corresponding Japanese Application No. JP 2019-564918, dated May 6, 2022.

* cited by examiner

| Vehicle speed (km/h) | Temperature outside vehicle (°C) | | | | | | | |
|---|---|---|---|---|---|---|---|---|
| | -40 | -25 | -15 | -10 | -5 | 0 | 5 |
| 130 | 13,5V | 13,5V | 13,5V | 13,5V | 13,5V | 13,5V | 13,5V |
| 100 | 13,5V | 13,5V | 13,5V | 13,5V | 13,5V | 13,5V | 13,5V |
| 50 | 13,5V | 13,5V | 13,5V | 13,5V | 13,5V | 13V | 12,5V |
| 30 | 13,5V | 13,5V | 13,5V | 13,5V | 13V | 12,5V | 12V |
| 0 | 9V cont. | 9V cont. | 9V & 50s ON /10s OFF | 9V & 50s ON /20s OFF | 9V & 40s ON /20s OFF | 9V & 30s ON /30s OFF | 9V & 20s ON /40s OFF |

Fig. 3

DEVICE FOR CONTROLLING AND REGULATING A WINDSCREEN WIPER BLADE HEATING CIRCUIT

TECHNICAL FIELD OF THE INVENTION

The invention relates to a device for controlling and regulating a heating circuit of a windshield wiper blade, said heating circuit comprising at least one resistive element integrated or associated with the wiper, said control and regulation device forming an autonomous assembly able to be mounted on a vehicle both as original and aftermarket equipment.

TECHNICAL BACKGROUND OF THE INVENTION

It is known for a windshield wiper blade of a motor vehicle to be heated in order to de-ice the wiper blade and its structure in particular and to improve the wiping performance levels for the window that the windshield wiper is designed to clean.

When the windshield wiper blade comprises internal channels for distributing a windshield washer liquid, heating the windshield wiper blade can also allow the windshield washer liquid to be heated before it is sprayed or projected onto the outer surface of the window, which also facilitates the operations of de-icing the window and optionally can allow the use of a manual scraper to be avoided.

The conventionally used heating means basically comprise an electrical heating circuit integrating a resistive heating element, such as an electrical heating resistor, which, when it is supplied with electric current, produces heat that is dissipated around the resistive element and/or is at least partially transferred to the elements with which it is in contact, in particular, for example, the strip of the wiper blade and/or its retention structure.

For example, it has already been proposed for the bending spine of a windshield wiper blade to be equipped with heating means in the form of an added film, which is adhered onto at least one of the two opposite flat faces of the spine and which comprises an electrical heating circuit.

The electrical heating circuit basically comprises, for example, a loop of an electrical conductor wire or a conductive track deposited or printed on a substrate, the ends of which are connected to electric current supply terminals connected to the battery of the vehicle.

According to a first variant, the control and the regulation of the heating circuit of a windshield wiper blade is a function that is directly managed by the driver of the vehicle, via a switch that is accessible on the dashboard in the cockpit of the vehicle in order to open, and respectively close, the electrical power supply circuit of the heating circuit of the wiper blades, in a similar manner to the circuit for de-icing a windshield. Preferably, the power supply circuit can be automatically closed after a determined heating duration or if the outside temperature is higher than a setpoint temperature, for example, by means of the electronic computer of the vehicle and of suitable associated sensors.

According to a second variant, the function for controlling and regulating the heating circuit of a windshield wiper blade also can be managed independently of the driver of the vehicle, by the electronic computer and the electrical circuit of the vehicle. To this end, measurements of the temperature outside the vehicle and of its speed are preferably integrated by the computer in order to control a power supply cycle of the heating circuit taking into account these parameters.

Whether it relates to the first or second variant described above, the function for controlling and regulating the heating circuit of a windshield wiper blade is predominantly limited to the "original equipment" of vehicles.

Indeed, this control requires, in order to be energy efficient and to comply with the integrity of the wiper blades, knowledge of the outside temperature, so that the heating circuit is only active in climatic conditions requiring said circuit, knowledge of the resistance or of the power of the heating circuit and, preferably, of the speed of the vehicle.

Therefore, these parameters need to be regulated and/or the vehicle and its electrical system need to be equipped with measuring devices that are adapted to this management of the control of the heating of the windshield wiper blades during the production stage of the vehicle, so as to avoid the users having to require expensive subsequent work.

However, it would be desirable for the use of windshield wiper blades provided with a heating circuit to be popularized so that consumers are able to equip their vehicle therewith as a function of their specific requirements and of seasonal variations, and therefore without the vehicle integrating a specific electrical architecture or computer programming to this end at its time of purchase.

The invention aims to propose a simple, effective and economical solution to this requirement, which is applicable to any motor vehicle, in particular as "aftermarket equipment".

BRIEF SUMMARY OF THE INVENTION

The present invention achieves its aim by proposing, according to a first object, an autonomous device for controlling a heating circuit of a windshield wiper blade of a motor vehicle, comprising a module for regulating the electrical power supply of the heating circuit, provided with an input for connecting to an electrical power generator and with an output for connecting to the terminals of said heating circuit of a windshield wiper blade. According to the invention, this control device is characterized in that it comprises means for acquiring, at an instant t, a data item representing a temperature outside the vehicle, on the one hand, and a data item representing the instantaneous speed of the vehicle, on the other hand, said acquisition means being configured to transmit said data to the regulation module.

The control device of the present invention has the advantage of being completely autonomous and thus of being able to be mounted on vehicles not originally equipped with windshield wiper blades provided with a heating circuit.

This control device comprises a regulation module that can be connected as input to an electrical power source, such as the battery of the vehicle, using any suitable means, as well as to the terminals of the heating circuit of said windshield wiper blade. It is thus possible for a consumer to equip their vehicle with a windshield wiper blade with a heating circuit for the winter periods, as they can for the tires of their vehicle, in order to optimize and safeguard their driving in the specific climatic conditions of this period.

The control device of the invention proves to be particularly advantageous in that it also allows optimized regulation of the electrical power supply of the heating circuit of a windshield wiper blade by taking into account, for the power supply of the heating circuit, parameters relating to the outside temperature and the speed of the vehicle, independently of any connection to the electronic computer and to the electrical circuit of the vehicle.

Thus, once the device is connected as input to the battery of the vehicle or to any other electrical power source and as output to the terminals of the heating circuit of the one or more windshield wiper blades, said device can autonomously control the heating of the heating circuit by acquiring, at a given instant t, the temperature outside the vehicle and the instantaneous speed of the vehicle, and by modulating the electrical power supply of the heating circuit accordingly. An optimized and safeguarded supply of the heating circuit is thus provided, guaranteeing the integrity of said circuit and of the one or more associated wiper blades.

In a particular embodiment of the device of the invention, said device comprises a sealed casing, inside which the regulation module and the means for acquiring a data item representing the instantaneous speed of the vehicle are at least arranged, with said connection inputs and outputs of the regulation module being arranged in order to be accessible on the outside of said casing.

In one embodiment, the means for acquiring a data item representing the instantaneous speed of the vehicle comprise a satellite positioning module.

Advantageously, the means for acquiring a data item representing a temperature outside the vehicle comprise a temperature probe.

According to a preferred embodiment, the means for acquiring a data item representing a temperature outside the vehicle and/or the means for acquiring a data item representing the instantaneous speed of the vehicle are integrated in the electrical regulation module.

More specifically, the electrical regulation module can particularly comprise an electronic board, on which components of an electronic regulation circuit, a satellite positioning module and, preferably, a temperature probe are arranged. Such a regulation module can be produced in the form of a very small electronic chip, which, once it is packed in suitable protective packaging, measures no more than a few square centimeters and is no more than a few millimeters thick. It is then very easy to be able to dispose the control device of the invention under the wiper blade supports, for example, or in any other zone under the hood of the vehicle, without requiring particular spatial arrangements for accommodating the device.

According to an advantageous feature of the control device of the invention, the satellite positioning module and/or the temperature probe form one or more switches of the electronic regulation module. Indeed, the regulation module is advantageously configured to integrate the data items representing the temperature and the speed as input conditions for its operation. Thus, if the temperature exceeds a certain threshold value, for example, 5° C., the regulation module and the control device of the invention do not deliver any power supply to the heating circuit. The same also can be the case in the event of zero speed, where appropriate. Finally, it is possible to combine the two temperature and speed input conditions in order to define different regulation regimes as a function of the temperature outside the vehicle and of the speed of the vehicle.

To this end, the electrical regulation module advantageously comprises, in a preferred embodiment, a microprocessor and a memory, in which memory a computer program is stored for regulating the electrical power supply of the heating circuit as a function of said data items representing the outside temperature and the instantaneous speed of the vehicle. The regulation program thus can very simply define the different regimes for regulating the heating circuit of the windshield wiper blades as previously described.

More advantageously, the regulation module of the control device of the invention also can be configured to analyze the power and/or resistance properties of the heating circuit and to regulate the electrical power supply of said heating circuit accordingly.

Thus, the control device of the invention advantageously can analyze, when it is connected to the terminals of a heating circuit of a windshield wiper blade, the electrical properties of this heating circuit, and particularly determine the compatibility of said wiper blade with the control device and, if compatible, the suitable electrical power supply properties.

The invention also relates to, according to a second object, an assembly kit comprising at least one windshield wiper blade equipped with a heating circuit and an autonomous control device as previously described.

Such an assembly kit forms, for the consumer, a turnkey solution for equipping their vehicle with one or more windshield wiper blades with a heating circuit and with an associated autonomous control device.

In an advantageous embodiment, the autonomous control device is arranged in a sealed casing, with said connection inputs and outputs of the regulation module being arranged in order to be accessible on the outside of said casing so that it can be connected to the heating circuit and to an electrical power generator.

More preferably, in this embodiment, the casing comprises means for protecting and sealing said connection inputs and outputs of the regulation module. Thus, the risks of a short-circuit in the electrical connections of the control device are prevented.

BRIEF DESCRIPTION OF THE FIGURES

Further features and advantages of the invention will become apparent from reading the following detailed description, which is provided by way of a non-limiting example and is understood with reference to the accompanying drawings, in which:

FIG. 3 shows, by way of a non-limiting illustration, an example of the regulation of the power supply voltage and of the cycles for powering-on windshield wiper blade heating circuits implemented by the device of the invention.

DETAILED DESCRIPTION OF THE FIGURES

Throughout the remainder of the description, elements with an identical structure or similar functions will be denoted using the same reference signs.

Figure 1:
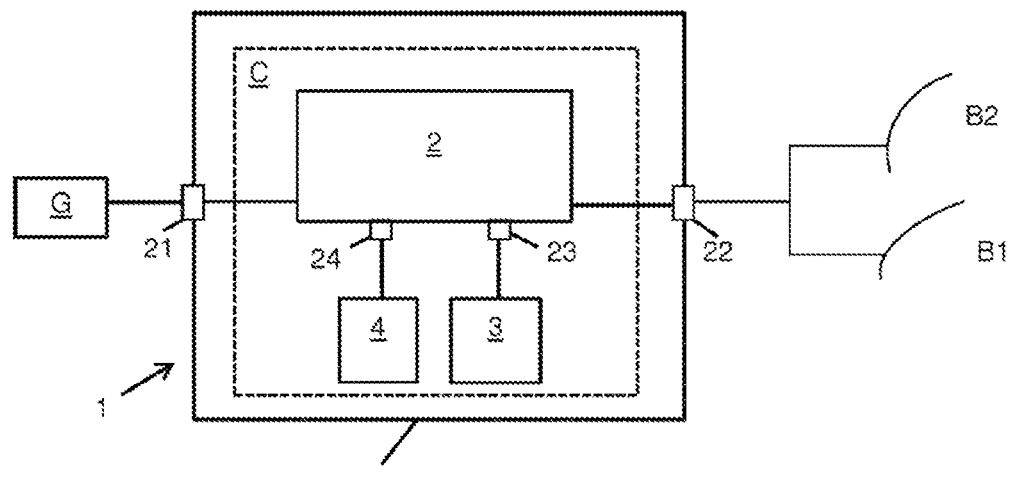
FIG. 1 is a schematic view of the autonomous control device of the present invention associated with an electrical power supply and a pair of windshield wiper blades provided with a heating circuit.

FIG. 1 shows, in a simplified schematic form, an autonomous device 1 for controlling the heating circuit of windshield wiper blades B1, B2 for motor vehicles. This device 1 has been designed and developed in order to autonomously control, i.e. independently of any other device or electronic system, in particular of a computer and existing sensors of a motor vehicle, the heating temperature of the heating wiper blades on a vehicle not originally equipped with such wiper blades.

Such windshield wiper blades with heating circuits are currently particularly used on top-of-the-range vehicles and in geographical areas with harsh climates, where the outdoor temperatures are frequently less than 5° C. and are even negative and therefore where frequent snow and ice can alter the visibility and, therefore, the circulation conditions of the motor vehicles.

An effective power supply for the heating circuits of such windshield wiper blades requires, in order to avoid excessively fast deterioration of the wiper blades, in particular of the resistive heating tracks and of the strips thereof, as well as excessive electrical consumption, knowledge of the outside temperature parameters, of the speed of the vehicle, and of the resistance and/or the electrical power of the resistive tracks forming said heating circuits.

Furthermore, such windshield wiper blades with heating circuits are basically mounted as standard production equipment for vehicles, with the electronic control of the power supply of the heating circuits being predefined in advance by the manufacturer in the computer of the vehicle, to which computer the heating circuits of the wiper blades are electrically connected, in particular in order to ensure that the power supply intensity is adapted to the resistance of the heating circuits, normally dependent on the length of the wiper blades.

The device 1 of the invention aims to provide a suitable solution for making the use of windshield wiper blades with a heating circuit "universal", i.e. both as the initial fitting as original equipment on motor vehicles and as aftermarket equipment on any type of vehicle not originally equipped therewith.

As can be seen from FIG. 1, the device 1 of the invention is an autonomous control device comprising a module 2 for electrically regulating the power supply of the heating circuit of windshield wiper blades B1, B2.

This regulation module 2 comprises an input 21 for connecting to an electrical power generator G, such as the battery of a motor vehicle. This input 21 for connecting to the battery G of the vehicle advantageously comprises a standard connection plug.

Furthermore, the regulation module 2 also comprises an output 22 for connecting to the terminals of the heating circuit (not shown) of each windshield wiper blade B1, B2. This output 22 for connecting to the heating circuits of the wiper blades B1, B2 of the vehicle also advantageously comprises one or more standard connection plugs, depending on the number of wiper blades to be connected. The output 22 thus can comprise two or three connection plugs if as many wiper blades are to be connected to the device 1.

By way of an example of windshield wiper blades B1, B2 equipped with heating circuits, the wiper blades of the type disclosed in patent applications US 2011/016653 or US 2013/269142 in the name of the Applicant can be cited.

The regulation module 2 has an electronic structure, which is not shown in the figures, particularly integrating at least one rectification circuit, one filtering circuit and one voltage regulation circuit as such.

These different components particularly can be integrated on an electronic board C and connected together by a printed circuit, which also connects the input 21 and output 22 of the regulation module 2.

In order to provide the device 1 of the invention with its autonomous nature for controlling the heating circuit of the wiper blades B1, B2, said device advantageously comprises means for acquiring, at an instant t, a data item representing a temperature outside the vehicle, as well as means for acquiring a data item representing the instantaneous speed of the vehicle, with said acquisition means being configured and arranged in the device 1 to transmit said data to the regulation module 2.

More specifically, the means for acquiring a data item representing the outside temperature advantageously comprise a temperature probe 3, which is electrically connected to an input 23 of the regulation module. This temperature probe 3 particularly can be a thermocouple type probe or even a thermoresistive probe, for example, of the platinum resistance type (reference sign PT) or thermistor type. This temperature probe 3 is directly connected, via the input 23, to the regulation module 2 using suitable wiring as a function of the type of probe.

The means for acquiring a data item representing the instantaneous speed of the vehicle for their part preferably comprise a satellite positioning module 4. This satellite positioning module 4 can be an independent functional module, connected by a power supply bus, and transmitting data to the regulation module on an input 24 of the regulation module 2.

Alternatively, the satellite positioning module 4 can be produced in the form of an integrated circuit directly positioned and wired on the electronic board C of the regulation module 2.

For the sake of clarity, FIG. 1 simply shows, as a functional diagram, the regulation module 2, the temperature probe 3 and the satellite positioning module 4 interconnected together, with the regulation module 2 respectively receiving, at the inputs 21, 23, 24 thereof, the power supply of the generator G, an outside temperature data item from the temperature probe 3 and an instantaneous speed at an instant t from the satellite positioning module 4. At the output 22, the regulation module 2 (and thus the device 1 of the invention) is directly connected to the heating circuits (not shown) of the windshield wiper blades B1, B2.

In order to ensure the integrity of the control device 1, all the electronic components thereof, and in particular the regulation module 2, as well as, preferably, the temperature probe 3 and the satellite positioning module 4, are integrated in a sealed casing 5, on the external surface of which only the connection inputs and outputs 21, 22 of the regulation module 2 are accessible to allow the casing 5 to be connected to the battery G of the vehicle, on the one hand, and to the windshield wiper blades B1, B2, on the other hand.

The casing 5 can assume varied shapes and dimensions, clearly as a function of the compactness of its integrated electronics and of the input and output connectors 21, 22 of the regulation module 2. However, preferably, the casing has maximum dimensions of the order of a few millimeters to centimeters at most in order to allow easy integration of the control device 1 directly on a windshield wiper blade support or even to allow it to be housed under the hood within the internal breadth of the engine compartment of the vehicle, as shown in FIG. 2.

In order to facilitate its installation, the casing 5 advantageously comprises reversible fastening means, for example, of the adhesive or snap-fit type, in order to facilitate the installation by an operator or by the owner of the vehicle themselves.

Figure 2:
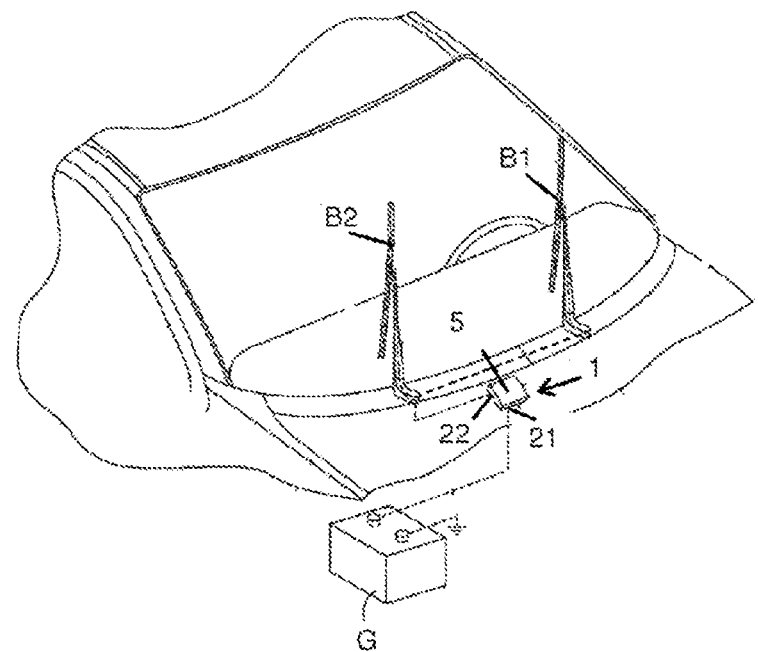
FIG. 2 shows an example of implementing an autonomous control device according to the present invention in a motor vehicle, shown as a partial perspective view.

Once connected to the battery G of the vehicle and to the heating circuits of the wiper blades B1, B2, as shown in FIG. 2, the control device 1 of the invention is thus completely autonomous with respect to its operation and thus can be implemented on any type of vehicle, irrespective of whether it is mounted as standard production equipment or as aftermarket equipment, as long as suitable wiring is provided to enable the device 1 to be connected to the input 21 and the output 22 of the regulation module 2.

It is thus very easy to equip a vehicle with wiper blades B1, B2 provided with heating circuits according to requirements and to control the operation of the heating circuits by means of the device 1 of the invention connected thereto and the battery G of the vehicle.

One aspect of the present invention also involves providing an assembly kit comprising at least one windshield wiper blade, or a pair of windshield wiper blades B1, B2, equipped with a heating circuit and an autonomous control device 1.

To allow optimal control of the heating circuits of the wiper blades B1, B2, the regulation module 2 of the device 1 advantageously comprises a microprocessor and a memory (not shown in the figures), in which memory a computer program is stored for regulating the electrical power supply of the heating circuits as a function of data relating to the outside temperature and the instantaneous speed of the vehicle that is transmitted by the probe 3 and the module 4.

The regulation program can thus very simply define different regimes for regulating the electrical power supply of the heating circuit of the windshield wiper blades B1, B2 as a function of the operating conditions of the vehicle, both for the outside temperature and for the instantaneous speed thereof, at an instant t.

FIG. 3 shows, solely by way of a non-limiting indication of the scope of the present invention, an example of cycles for regulating the power supply of heating wiper blades as a function of values relating to the outside temperatures and the speeds of the vehicle. Such regulation cycles can be implemented very simply and reliably in a programming algorithm using any suitable language and can be stored in the memory of the regulation module. The microprocessor then communicates with the memory to operate the program stored therein and to thus, as a function of the data received from the temperature probe 3 and from the satellite positioning module 4, control the regulation circuit so that said circuit delivers the suitable power supply, by voltage and by intensity, and according to the adapted timing at the output 22 of the regulation module 2.

Thus, with reference to FIG. 3, if the temperature probe notifies the regulation module 2 that the outside temperature is −10° C. and the satellite positioning module 4 computes that the vehicle is running at 100 km/h, the regulation module 2 then delivers a signal for supplying a direct voltage of 13.5 V at its output 22 to the wiper blades B1, B2.

Similarly, if the vehicle is stopped, for example, in a traffic jam or at a traffic light, therefore at zero speed, and the outdoor temperature is −5° C., the regulation module 2 then delivers a signal for supplying a voltage of 9 V for 40 seconds, then stops for 20 seconds and repeats this cycle for as long as the speed of the vehicle does not reach the speed threshold of more than 30 km/h of the regulation program. In this case, the clock of the microprocessor or an ancillary clock can be used to countdown the duration for opening, and respectively closing, the power supply at the output 22 of the regulation module 2.

By contrast, if the measurement of the ambient temperature by the temperature probe 3 is higher than 5° C., the regulation module 2 cuts the electrical power supply to the wiper blades B1, B2 to avoid unnecessarily heating the respective heating circuits thereof. The temperature probe 3, which provides an input data item contingent upon the operation of the regulation module 2, advantageously acts like a switch of the power supply device 1.

Similarly, it is also possible to contemplate configuring or programming the regulation module 2, particularly if said module is controlled using a program stored in a memory by a microprocessor, as previously indicated, so that the satellite positioning module 4 also acts like a switch of the regulation module, for example, when the vehicle is stopped for an extended period, while the engine ignition is still active. Again, in this case, the duration before cut off can be computed via the clock of the microprocessor or an ancillary clock integrated in the regulation module 2.

Advantageously, the regulation module 2 is also configured to analyze the electrical power and/or resistance properties of the heating circuits of the wiper blades B1, B2, in order to adapt the intensity of the power supply signal delivered at the output 22, which depends on the length of the heating circuit, as a function of this resistance.

Thus, when the windshield wiper blades B1, B2 are connected, the regulation module 2 can detect a change of state of the electrical circuit at the output 22 thereof. This detection automatically results in the initiation of a test cycle by the microprocessor that is intended to analyze the electrical properties of the heating circuits of each of the wiper blades, to ensure, as a function of the supply, the delivery of a current adapted to comply with all these heating circuits.

This phase of testing the circuit when new wiper blades B1, B2 are connected also can allow the compatibility of the one or more wiper blades B1, B2 with the control device 1 to be determined and thus prevent the use of incompatible wiper blades, in order to particularly avoid any general disruption in the electrical circuit of the vehicle.

This test phase also advantageously can include a phase of authenticating the wiper blades B1, B2 in order to determine their origin, by identifying a determined electrical response to a stimulus signal transmitted by the regulation module 2 upon the connection of the wiper blades B1, B2 to the control device of the invention.

The present invention thus provides a simple and, especially, an autonomous solution for controlling the heating circuit of windshield wiper blades, allowing such blades to be used as aftermarket equipment on any type of motor vehicle.

The invention claimed is:

1. A device for controlling a heating circuit of a windshield wiper blade of a motor vehicle, comprising:
   a sealed casing;
   an electrical regulation module for regulating the electrical power supply of the heating circuit, provided with an input for connecting to an electrical power generator and with an output for connecting to terminals of said heating circuit of the windshield wiper blade, with the regulation module being inside the sealed casing;
   a temperature probe for acquiring, at an instant t, a temperature outside the vehicle, with the temperature probe being inside the sealed casing and configured to transmit the temperature to the regulation module; and
   a satellite positioning module for acquiring an instantaneous speed of the vehicle, with the satellite positioning module being inside the sealed case and being configured to transmit said data to the regulation module.

2. The device as claimed in claim 1, characterized in that connection inputs and outputs of the regulation module being arranged in order to be accessible outside of said casing.

3. The device as claimed in claim 1, wherein the temperature probe include a platinum resistance type temperature probe.

4. The device as claimed in claim 1, wherein at least the temperature probe or the means for acquiring a data item representing the instantaneous speed of the vehicle are integrated in the electrical regulation module.

5. The device as claimed in claim 1, characterized in that the electrical regulation module comprises an electronic board, on which components of an electronic regulation circuit, a satellite positioning module and, the temperature probe are arranged.

6. The device as claimed in claim 5, wherein at least the satellite positioning module or the temperature probe form one or more switches of the electronic regulation circuit.

7. The device as claimed in claim 5, characterized in that the electrical regulation module comprises a microprocessor and a memory, in which memory a computer program is stored for regulating the electrical power supply of the heating circuit as a function of said data items representing the temperature and the instantaneous speed of the vehicle.

8. The device as claimed in claim 1, characterized in that the electrical regulation module is configured to analyze the power and resistance properties of the heating circuit and to regulate the electrical power supply of said heating circuit accordingly.

9. An assembly kit comprising at least one windshield wiper blade equipped with a heating circuit and a control device according to claim 1.

10. An assembly kit as claimed in claim 9, characterized in that the control device is arranged in a sealed casing, with said connection inputs and outputs of the regulation module being arranged in order to be accessible on the outside of said casing so that it can be connected to the heating circuit and to an electrical power generator.

11. An assembly kit as claimed in claim 10, characterized in that the casing comprises means for protecting and sealing said connection inputs and outputs of the regulation module.

* * * * *